E. WALDEN.
EDUCATIONAL APPARATUS.
APPLICATION FILED MAY 24, 1917.
1,257,655.
Patented Feb. 26, 1918.
2 SHEETS—SHEET 1.
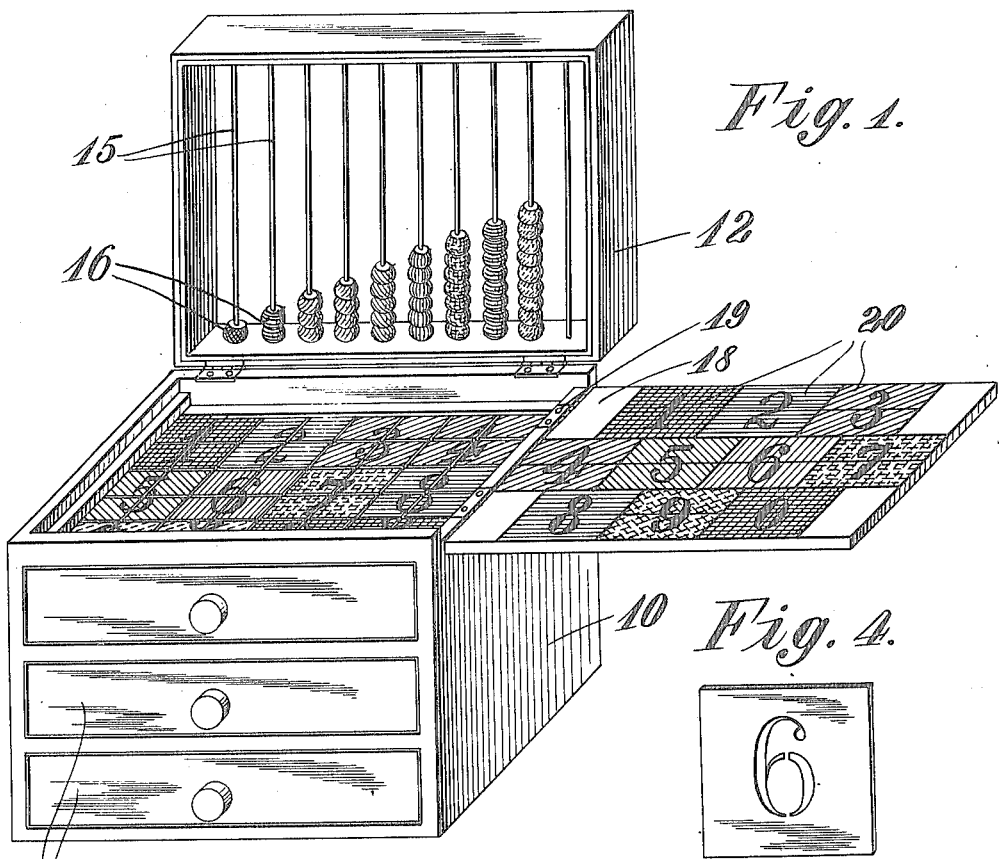
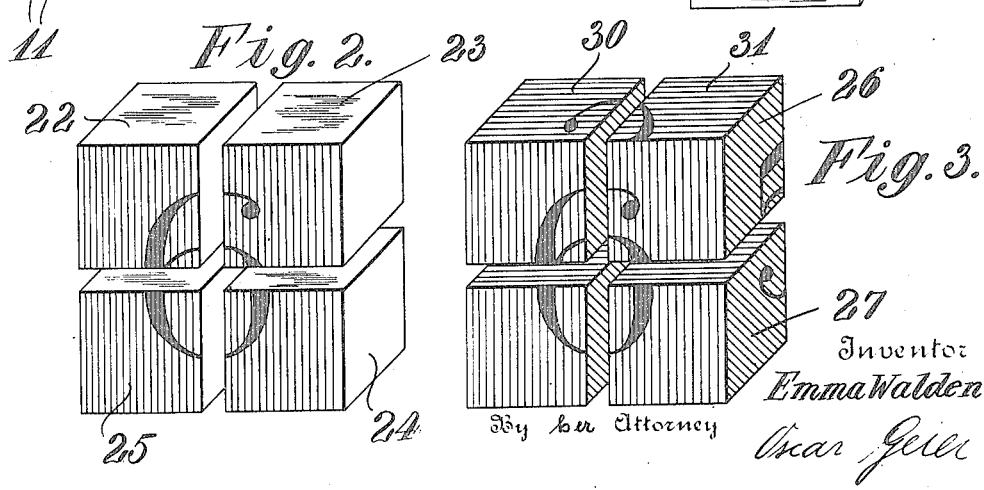
Inventor
Emma Walden
By her Attorney
Oscar Geier

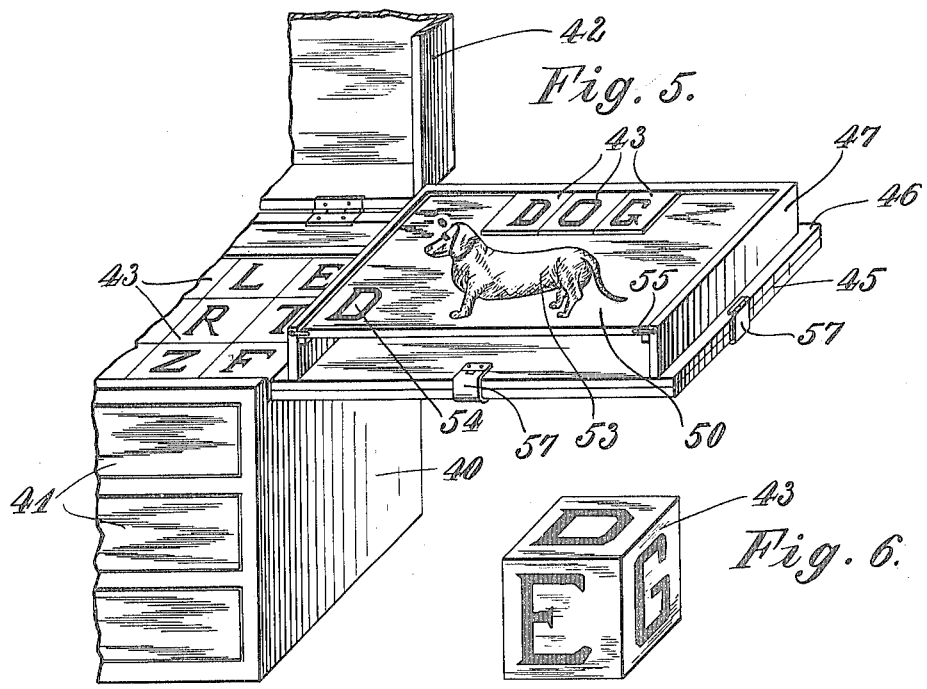
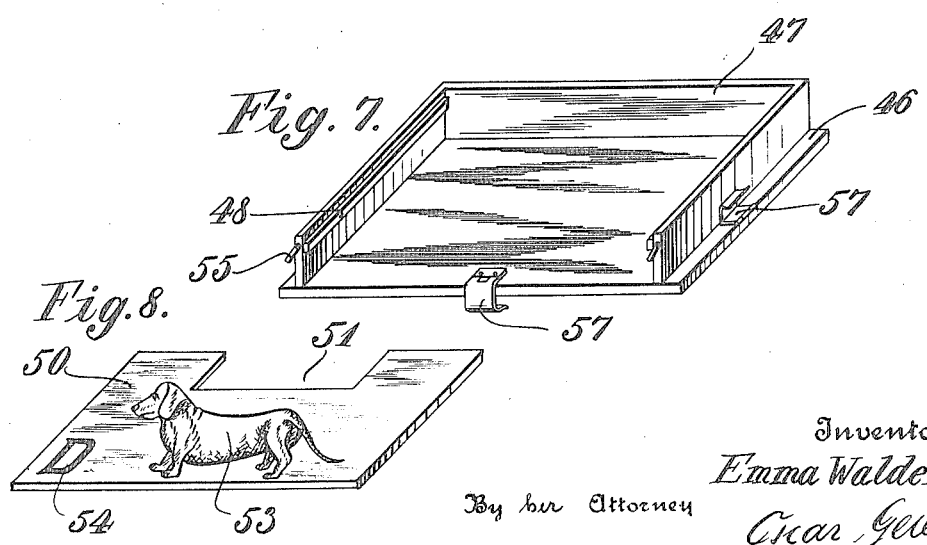

UNITED STATES PATENT OFFICE.

EMMA WALDEN, OF NEW YORK, N. Y.

EDUCATIONAL APPARATUS.

1,257,655.    Specification of Letters Patent.    Patented Feb. 26, 1918.

Application filed May 24, 1917. Serial No. 170,577.

*To all whom it may concern:*

Be it known that I, EMMA WALDEN, a subject of the Czar of Russia, resident of New York, county of New York, and State of New York, have invented certain new and useful Improvements in Educational Apparatus, of which the following is a specification.

This invention relates to improvements in educational apparatus, and has as its principal object the provision of means for teaching the configuration of, and distinguishing numerals and alphabetical characters in an entertaining manner.

Another object is to provide such apparatus in forms which are readily portable so that the same may be used either at home or in school with equal facility.

A still further object is to provide with the apparatus means whereby such characters may be correctly delineated by mechanical means.

These and other like objects are attained by the novel construction and combination of parts hereafter described and shown in the accompanying drawings, forming a material part of this specification, and in which:—

Figure 1 is a perspective view showing one form of the apparatus with the parts extended as in use.

Fig. 2 is a perspective view showing one form of sectional block indicating a certain character.

Fig. 3 is a similar view of a modified form of block showing a variety of characters arranged on its several faces.

Fig. 4 is a plan view showing a stencil by means of which the character can be transferred.

Fig. 5 is a perspective view similar to that of Fig. 1 but showing the device as used with letters of the alphabet rather than with numerals.

Fig. 6 is a perspective view of a single block upon which the letters are displayed.

Fig. 7 is a perspective view of the display tray, and plate support, and

Fig. 8 is a perspective view of the plate in detail.

The several devices are preferably inclosed in a container 10 provided with a plurality of drawers 11 adapted to contain pencils, erasers, paper, etc., etc., together with such blocks as are not in use, and also the stencil plates so that the same may not become mislaid.

Hingedly attached to the container is a cover 12, having arranged within its interior ten parallel rods 15, vertically positioned when in use, one rod being bare and the others having strung upon them beads from one to nine inclusive, arranged in regular numerical order, the beads on each wire being colored alike and differently from the beads on any other wire, as for instance the six beads on the sixth wire are all colored red in distinction from any others.

The upper portion of the container 10 is formed with a relatively deep compartment adapted to contain the several blocks, a cover plate 18 being engaged by hinges 19 in such manner as to be swung laterally outward, as shown in Fig. 1, or when reversed to cover the several blocks.

Displayed upon the exposed surface of the cover plate 18, in numerical order, are a plurality of numerals imprinted upon essentially rectangular, individual backgrounds 20, having central cross-lines and colored as indicated, each of the backgrounds being colored distinctly so as to aid the user in associating and assembling similarly colored blocks, formed in four equal portions 22, 23, 24, and 25, the faces of each portion having upon them a fragment or part of a numeral and being colored to correspond with the same numeral shown on the plate 18, the faces, when correctly assembled, representing a complete numeral, as for instance the figure 6, the face of this block showing a red color, as is also the corresponding numeral 6, displayed upon the leaf or cover plate 18, and the six beads upon the sixth wire.

In Fig. 3 a slightly different form of block from that in Fig. 2 is disclosed, in which each of the six sides of the complete cube show a different numeral and different color. For instance, the face showing the numeral 6 is colored red over its entire surface, one of its adjacent sides discloses part of the numeral 5 upon the sections 26 and 27, the same being printed upon a green background; the top of the block shows part of another numeral as 2, and is partially disclosed upon the block faces 30 and 31 upon a blue background, and so on through all of the numerals from 1 to 0 inclusive.

In addition, the drawers 11 may be used to contain the various assortment of articles used, and plates of thin material in which partial numerals are cut through, forming in effect stencils, which may be followed by a sharp pencil or stylus delineating the same upon any level surface.

In Figs. 5 to 8 inclusive is shown another adaptation in which a plurality of blocks containing letters of the alphabet are disposed within a similar casing 40 having drawers 41 and a cover 42; the upper part of the container being adapted to contain a plurality of cubical blocks 43 upon the several faces of which are disposed a specific character, for instance the letter "D".

A hinged intermediate cover 45 is arranged to turn outwardly below the main cover 42 and receive upon its upper surface, when extended, a plate 46 upon three sides of which are raised projections 47 the two side elements having secured on their inner surfaces cleats 48 receptive of the plate 50, upon the surface of which is disposed a simple device indicative of the word to be spelled, and containing a recess 51 at its rear edge of sufficient size to receive all the blocks necessary to construct the word depicted by the object displayed upon the surface of the plate, as for instance, the dog 53 and initial letter 54. These cleats are adapted to be held in position within the tray structure by the buttons 55 secured to the front edge of the side elements 47, the tray being held in position with respect to the cover 44 by means of suitable clips 57.

Thus when it is desired to teach the proper formation of any simple word, as for instance that indicated, the block containing the picture of a dog is inserted in the tray, resting upon the cleats 48, the initial letter indicating the first letter to be selected.

It will be obvious that sufficient letters represented on the blocks 43 must be used in order to fill the space, and that no greater number can be inserted, thereby materially assisting in the proper spelling of the word.

Having thus described the purpose, construction and application of the invention, what I claim as new, and desire to secure by Letters Patent, is:—

1. A receptacle having drawers therein adapted to contain a plurality of figure blocks, a lid, and a supplementary cover adapted to be disposed over said drawers and below said lid, said cover having a series of numerals from 1 to 0 displayed thereon upon backgrounds of contrasting colors.

2. The combination with a plate having printed numerals thereon, of a contrastingly colored background for said numerals, a plurality of blocks formed in four sections, each of said sections having a predetermined color, and also bearing a portion of a definite numeral displayed thereon with relation to the colored background of the numeral on said plate.

3. An educational toy comprising a plurality of blocks, each block consisting of four sections, the face of each section being of a predetermined distinctive color and having imprinted thereupon a portion of a given numeral to which the mentioned color is assigned, said color being unlike the colors assigned to any other numeral.

4. An educational block for teaching numerals comprising a plurality of rectangular elements having different colors upon each of their faces and bearing portions of a numeral characterized by a definite color, so that when correctly assembled the blocks will show a complete numeral upon a background of an assigned distinctive color unlike that of the other faces.

5. An educational device comprising a plurality of cubical elements having a significent character disposed upon each of its several surfaces, a receptacle adapted to contain the same, a hinged cover engaged with said receptacle a tray removably engaged therewith, and a plurality of plates engageable with said tray, each of said plates having a recess receptive of a predetermined number of said blocks and bearing the representation of an object to be spelled.

6. An educational device comprising a container, a plurality of cubical blocks receivable therewithin, a hinged element engaged with said container, a plate engageable within said hinged element, said plate containing an opening receptive of a predetermined number of blocks, and bearing the representation of an object to be determined, and means for securing said plate within said tray.

In testimony whereof I have affixed my signature.

EMMA WALDEN.